Oct. 24, 1939.  D. E. CRABB  2,177,384
ADJUSTABLE SEAT
Filed Dec. 14, 1936
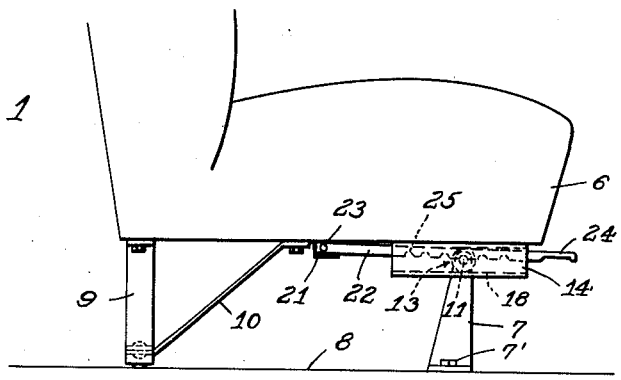
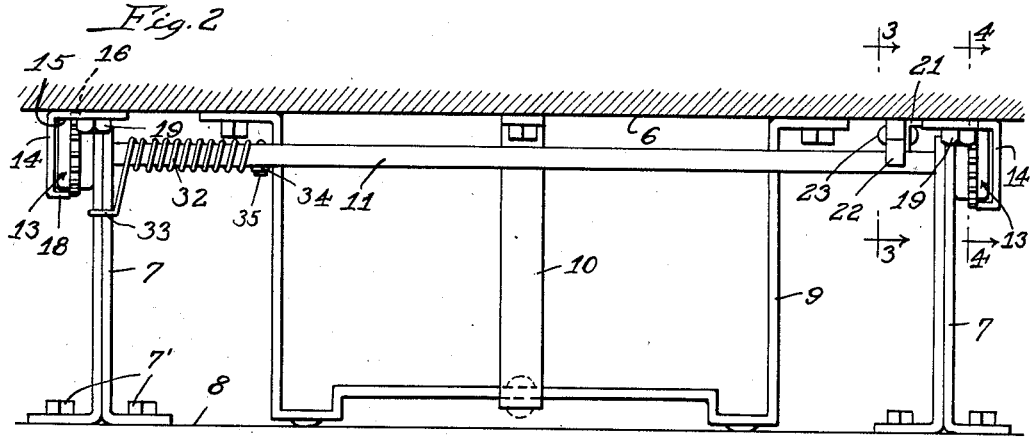
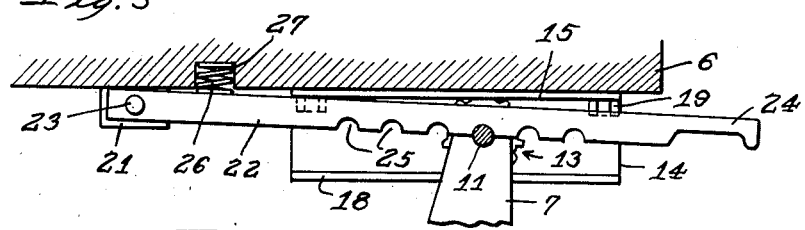
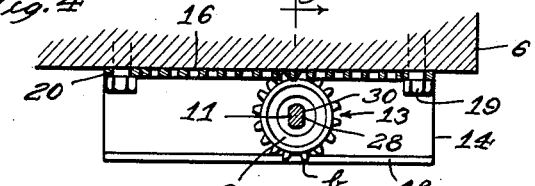
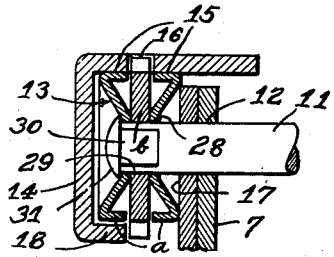
Inventor:
Donald E. Crabb Patented Oct. 24, 1939

2,177,384

UNITED STATES PATENT OFFICE 2,177,384

ADJUSTABLE SEAT

Donald E. Crabb, Detroit, Mich., assignor to The Atwood Vacuum Machine Company, Rockford, Ill., a co-partnership composed of Seth B. Atwood and James T. Atwood Application December 14, 1936, Serial No. 115,730

6 Claims. (Cl. 155—14)

This invention relates to adjustable seats especially designed and adapted for use in motor vehicles.

The front seat or seats in motor vehicles are usually arranged for back and forth adjustment, mainly to suit the convenience and comfort of the driver. In the case of two-door sedans, it is also necessary that one or both of the front seats be movable and/or tiltable forwardly to permit entrance and exit of rear seat passengers. We are aware that there have been many slidable seat mountings adopted commercially, and many more proposed, but, generally speaking, they have not been as simple and economical in construction as desired, and many failed to operate smoothly and easily when made up from stamped sheet metal parts in quantity production. It is the principal object of my invention to provide a seat mounting affording sliding adjustment and tilting movement, both with unusually smooth, easy, and quiet operation, even though the mounting is made up of stamped sheet metal parts throughout for the desired economy.

A salient feature of this invention consists in the novel compact assembly of the floor brackets, seat slides, and combination gear and roller elements, the latter being disposed bearing against the outside of the floor brackets to assume side thrust and having rolling contact and meshing engagement with the seat slides, for anti-friction roller support of the seat for back and forth adjustment thereof and dual rack and gear connection with the seat to insure parallel motion and avoid binding and chattering. The combination gear and roller elements are also arranged to engage bottom flanges on the seat slides to prevent backward tilting, and they further constitute pivotal supports for the seat on the floor brackets to permit forward tilting.

An important feature also is the novel provision of spring means exerting a torsional thrust for assisting forward movement of the seat so that less effort is required on the part of the operator.

Another feature of my invention consists in the arrangement of the fastening bolts for the seat slides adjacent opposite ends of the rack teeth therein, so that the heads of the bolts constitute limiting stops to be engaged by the gear roller elements.

Still another feature consists in the provision of a spring-pressed latch for locking the seat mounted on the bottom of the seat in transverse relation to the cross-shaft and notched at a series of points spaced longitudinally thereof for locking engagement with the shaft in different positions of adjustment of the seat.

The invention is illustrated in the accompanying drawing, in which—

Fig. 1 is a side view of an adjustable seat having a mounting made in accordance with my invention;

Fig. 2 is a front view of the mounting on a larger scale;

Figs. 3 and 4 are cross-sections taken on the correspondingly numbered lines of Fig. 2, and Fig. 5 is a sectional detail on the line 5—5 of Fig. 4, on a still larger scale.

The same reference numerals are applied to corresponding parts throughout the views.

The seat 6 is a single passenger front seat for an automobile, arranged to be adjusted forwardly and rearwardly and also to be tilted forwardly when occasion requires. Now, of course, while this is a single seat, it should be understood that the mounting therefor, hereinafter described, would also be suitable for a double seat.

A pair of brackets 7 support the front of the seat in spaced relation to the floor 8 for back and forth adjustment and tilting movement. A leg 9 is fixed to the bottom of the seat at the rear and rests on the floor but will slide forwardly or rearwardly in the adjustment of the seat. The leg 9 may be of any suitable or preferred construction, but is herein shown as made in one piece with a forwardly extending brace 10 attached thereto, as shown. A cross-shaft 11 is rotatably received near its opposite ends in bearing holes 12 in the brackets 7 and has combination roller and gear elements 13 fixed on the projecting ends thereof. The latter operate in slides 14 of L-shaped cross-section fastened to the bottom of the seat, the roller portions $a$ of the elements 13 riding on track surfaces 15 on the slides and providing anti-friction roller support for the seat, and the gear portions $b$ thereof having meshing engagement with rack teeth 16 in the slides to simultaneously insure parallel motion so that the seat adjusts uniformly and without binding. The elements 13 furthermore have abutment with the side surfaces 17 of the brackets 7 to assume side thrust of the seat in relation to the brackets. A longitudinal bottom flange 18 on each slide also extends under the roller portions $a$ of the elements 13, as clearly appears in Figs. 2 and 5, and will come into engagement therewith to prevent rearward tilting when the passenger throws his weight against the back of the seat. I may mount the elements 13 on the shaft 11 on the inner side of the floor brackets and have only the ends of the shaft projecting for engagement with longitudinal flanges like flanges 18 on the slides. In addition to the four different functions described, the elements 13 together with the shaft 11 provide the fulcrums on which the seat pivots in tilting forwardly. The elements 13 perform still another function, namely, that of limiting the back and forth adjustment of the seat by engagement with the heads of bolts 19 provided for fastening the slides 14 to the bottom of the seat. These bolts, as appears in Fig. 4, are entered through holes 20 in the ends of the slides adjacent the ends of the racks 16. Of course, the bolts 19 are not entered until the elements 13 have been assembled in the slides.

The shaft 11 being fixedly located with reference to the floor 8 in the brackets 7 may be utilized as a means of locking the seat against movement from adjusted position. I provide a separate sheet metal bracket 21 fastened suitably to the bottom of the seat, or a similar latch support integral with one of the slides 14, and have a latch 22 pivoted thereon, as at 23, and arranged to extend forwardly and project slightly from beneath the front of the seat, at which end a handle or finger grip portion 24 is formed. A series of longitudinally spaced semi-circular notches 25 are provided in the bottom edge of this latch to receive the shaft 11 in any one of a number of positions of adjustment of the seat. Of course, the latch would fall into locking position by gravity, but I prefer to provide any suitable spring means to operate it, such as a coiled compression spring 26 seated in a recess 27 in the bottom of the seat and engaging the top of the latch near the pivot 23 to urge the latch normally toward locking position. This makes for positive and secure locking of the seat in adjusted position. The fact that the spring is in such close relation to the pivot 23 makes it easy to release the latch, even though the spring affords a fairly heavy pressure keeping the latch securely engaged with the shaft 11. If desired, a similar latch may be provided swingable upwardly to locking position by spring action. Furthermore, while only one latch is shown, I may provide two at opposite ends of a double seat, interconnected for simultaneous operation. Double locking might also be used on a single width seat.

In operation, the passenger simply lifts up on the front end of the latch 22 to release the seat for sliding movement forwardly or rearwardly. The movement of the seat is rendered easy by virtue of the rollers a, while the gears b operating in the racks 16 insure parallel motion and prevent binding. When the seat is properly adjusted, the latch 22 is released and the shaft 11 finds engagement in whichever notch 25 has been brought into register therewith, the spring 26 urging the latch toward engagement with the shaft. The seat is thereby locked securely in adjusted position. As previously pointed out, the elements 13 formed by the rollers a and gears b perform the additional functions of (1) providing fulcrums for the seat in tilting forwardly; (2) assuming side thrust of the seat in relation to the floor brackets 7 as the passenger shifts about in the seat from side to side, and (3) preventing rearward tilting of the seat by contact with the flanges 18 when the passenger throws his weight against the back of the seat.

It will be observed that the seat mounting is made almost entirely of stamped sheet metal parts for lightness and cheapness, but while such construction frequently militates against smoothness of operation in structures of this kind, it does not in the present case because of the novel and advantageous arrangement of the elements 13 with relation to the brackets 7 and slides 14, as has been pointed out above. The desired strength and rigidity in the floor brackets 7 is secured by the employment of two opposed L-shaped sheet metal members welded together and fastened to the floor 8 on opposite sides, as at 7'. The slides 14 are mounted so that very little strain is placed thereon and the provision of the flanges 18 on these members serves somewhat as reenforcement therefor, although primarily provided for abutment with the rollers a, as pointed out. The gear-roller elements 13 are each made up of three parts, two roller parts and one gear part, all stamped from sheet metal. The roller parts a both have depressed central portions for abutment with the gear b on opposite sides, as best appears in Fig. 5, and have oblong center holes 28 registering with a similar hole 29 provided in the center of the gear b. The rollers a and gear b are usually, although not necessarily, spot-welded together before they are assembled on the end of the shaft 11, which, as shown, has flats 30 milled thereon so as to fit snugly in the holes 28 and 29. The ends of the shaft 11 will project sufficiently to permit securely fastening the elements 13 thereon by merely upsetting these ends as at 31. This method of fastening is practical because the depressions in the sides of the rollers a provide space for the projecting upset ends 31 of the shaft 11, so that nothing projects beyond the plane of the sides of the rollers and they can therefore be located close to the slides, with only working clearance if desired. The upsetting of the ends 31 secures the elements 13 in tight engagement with the shoulders defined at the inner ends of the flats 30 so that these parts are not apt to work loose or get free to turn with respect to the shaft.

A coiled spring 32 is mounted on one end of the shaft 11 and has its one end 33 hooked securely onto the adjacent floor bracket 7 and its other end 34 hooked securely onto a rivet 35 passed through a diametrical hole in the shaft. This spring is preloaded, that is, twisted sufficiently at the time of assembling the seat in the car, so that it will exert appreciable torsional thrust on the shaft 11 and elements 13 in the direction of forward movement of the seat. Thus, when the seat is unlocked, the spring will assist in forward movement and resist rearward movement. Of course, it is well known that the operator has no difficulty in moving a seat to the rear, because he can bear fully against the back of the seat and easily force the seat to move to the rear, but there is real need for such assistance as the spring 32 will give in forward movement, because the operator can't get a good purchase on the seat to move it forward. The spring 32 adds very little to the cost of the seat; its cost is negligible compared to the advantage it gives in easier operation of the seat. It is also apparent that the novel mode of attachment of the spring to the seat makes for the desired compactness and ease of assembling.

It is believed the foregoing description conveys a good understanding of the objects and advantages of my invention. The appended claims have been drawn with a view to covering all legitimate modifications and adaptations.

I claim:
1. A mounting for slidable seats comprising laterally spaced brackets adapted for attachment to the floor of a vehicle, laterally spaced elongated sheet metal seat brackets having gear racks thereon extending in the direction of sliding movement of the seat and smooth track surfaces alongside said racks, the racks comprising uniformly spaced holes provided in said brackets paralleling the track surfaces, and a shaft journalled in the floor brackets and having a single pair of toothed wheels thereon meshing with the racks of the other brackets, both of said toothed wheels being formed to provide annular shoulders thereon next to the teeth arranged to ride on the aforesaid smooth track surfaces to provide antifriction roller support of the seat brackets on the floor brackets while the intermeshed racks and gears insure the same rate of travel of both seat brackets so as to avoid binding action, the seat brackets also having downwardly projecting longitudinal side walls with longitudinal retaining flanges formed thereon projecting inwardly toward the floor brackets parallel with the track surfaces for engagement with the annular shoulders of said toothed wheels on the diametrically opposite side from their engagement with the tracks whereby to prevent vertical displacement of the seat brackets relative to the floor brackets.

2. A mounting for slidable seats comprising laterally spaced brackets adapted for attachment to the floor of a vehicle, laterally spaced elongated sheet metal seat brackets having gear racks thereon extending in the direction of sliding movement of the seat and smooth track surfaces alongside said racks, the racks comprising uniformly spaced holes provided in said brackets paralleling the track surfaces, and a shaft journalled in the floor brackets and having a single pair of toothed wheels thereon meshing with the racks of the other brackets, both of said toothed wheels being formed to provide annular shoulders thereon next to the teeth arranged to ride on the aforesaid smooth track surfaces to provide antifriction roller support of the seat brackets on the floor brackets while the intermeshed racks and gears insure the same rate of travel of both seat brackets so as to avoid binding action, the seat brackets also having downwardly projecting longitudinal side walls with longitudinal retaining flanges formed thereon projecting inwardly toward the floor brackets parallel with the track surfaces for engagement with the annular shoulders of said toothed wheels on the diametrically opposite side from their engagement with the tracks whereby to prevent vertical displacement of the seat brackets relative to the floor brackets, the floor brackets and the side walls of the seat brackets being disposed closely alongside opposite sides of said toothed wheels to prevent lateral displacement of the seat relative to the floor brackets.

3. As an article of manufacture, a combination roller and gear for a slidable seat mounting comprising a gear, and an annularly flanged disc disposed with its flange projecting toward the gear, the diameter of the flange being less than the gear diameter so as to provide an annular shoulder alongside the teeth thereof, and the central portion of said disc being depressed toward and engaging the side of the gear at the central portion thereof, and a shaft having a cylindrical end machined off on the side to provide a flat drive surface thereon next to a retaining shoulder, and said disc and gear having registering center holes provided therein conformed to fit closely and non-rotatably on the machined end of said shaft in abutment with the shoulder, the end of the shaft projecting through said combination and being upset to secure the same permanently thereon.

4. As an article of manufacture, a combination roller and gear for a slidable seat mounting comprising a gear, and a pair of annularly flanged discs each disposed with its flange projecting toward the gear, the diameter of the flange being less than the gear diameter so as to provide an annular shoulder alongside the teeth thereof on both sides of the gear, and the central portions of said discs being depressed toward and engaging the opposite sides of the gear at the central portion thereof, and a shaft adapted to be non-rotatably secured to the aforesaid parts, the same having a cylindrical end machined off on the side to provide a flat drive surface thereon next to a retaining shoulder, and said discs and gear having registering center holes provided therein conformed to fit closely and non-rotatably on the machined end of said shaft in abutment with the shoulder, the end of the shaft projecting through the center holes of the gear-roller assembly and the projecting end of said shaft being upset within the depressed central portion of the outer disc whereby to secure the parts to the shaft.

5. As an article of manufacture, a combination roller and gear for a slidable seat mounting comprising a gear, and an annularly flanged disc disposed with its flange projecting toward the gear, the diameter of the flange being less than the gear diameter so as to provide an annular shoulder alongside the teeth thereof, and the central portion of said disc being depressed toward and engaging the side of the gear at the central portion thereof, and a shaft having a cylindrical end machined off on the side to provide a flat drive surface thereon next to a retaining shoulder, said disc and gear having registering center holes provided therein conformed to fit closely and non-rotatably on the machined end of said shaft in abutment with the shoulder, the end of the shaft projecting through said combination, and means for securing said combination thereon.

6. As an article of manufacture, a combination roller and gear for a slidable seat mounting comprising a gear, and a pair of annularly flanged discs each disposed with its flange projecting toward the gear, the diameter of the flange being less than the gear diameter so as to provide an annular shoulder alongside the teeth thereof on both sides of the gear, and the central portions of said discs being depressed toward and engaging the opposite sides of the gear at the central portion thereof, and a shaft adapted to be non-rotatably secured to the aforesaid parts, the same having a cylindrical end machined off on the side to provide a flat drive surface thereon next to a retaining shoulder, and said discs and gear having registering center holes provided therein conformed to fit closely and non-rotatably on the machined end of said shaft in abutment with the shoulder, the end of the shaft projecting through the center holes of the gear-roller assembly, and means on said projecting end for securing the assembly to the shaft.

DONALD E. CRABB.